No. 754,501. PATENTED MAR. 15, 1904.
R. R. REYNOLDS.
LARDING OR SALTING DEVICE.
APPLICATION FILED MAR. 11, 1903.
NO MODEL.

WITNESSES:
Henrietta Stulz
Allen Ross

INVENTOR
Robert R. Reynolds
BY
Eugene Beark
ATTORNEY

No. 754,501. Patented March 15, 1904.

UNITED STATES PATENT OFFICE.

ROBERT R. REYNOLDS, OF NEW YORK, N. Y.

LARDING OR SALTING DEVICE.

SPECIFICATION forming part of Letters Patent No. 754,501, dated March 15, 1904.

Application filed March 11, 1903. Serial No. 147,349. (No model.)

*To all whom it may concern:*

Be it known that I, ROBERT R. REYNOLDS, a citizen of the United States, residing at New York, in the county of New York and State of New York, have invented a new and useful Larding or Salting Device, of which the following is a specification.

My invention relates to a device or tool for larding or salting meats.

The preferred form of device embodying my invention is illustrated in the accompanying drawings, throughout the several views of which the same numerals of reference are used to designate like parts.

Figure 1:
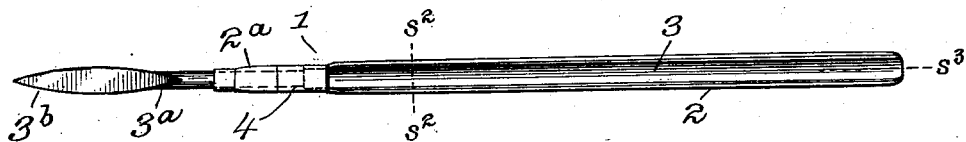
Figures 2, 3, 4:
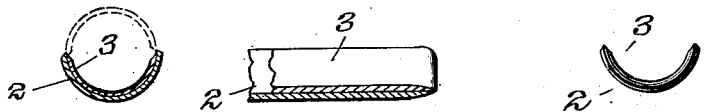
Figure 5:
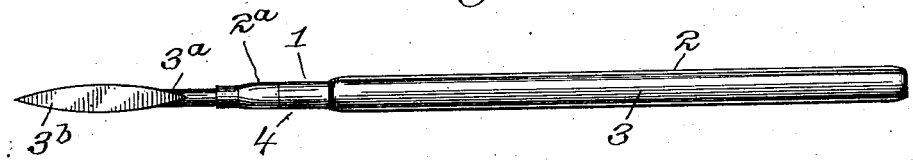

In the drawings, Figure 1 is a view in elevation of the larding-tool, showing the tube thereof open. Fig. 2 is a cross-sectional view on the line $S^2 S^2$ of Fig. 1. Fig. 3 is a fragmentary longitudinal section on the line $S^3 S^3$ of Fig. 1. Fig. 4 is an end view of the tool looking from the right, and Fig. 5 is a view showing the tool as in Fig. 1 with the tube thereof closed.

Referring to the drawings, the tool 1 is shown as consisting of two semicylindrical members 2 and 3, secured together at one end by a swivel connection, as indicated at 4, and adapted to turn one within the other to close or open the tube throughout its effective length. The inner member 3 terminates in a solid shank $3^a$, which extends through a terminal sleeve $2^a$ of the member 2 and is pointed and flattened, as at $3^b$, to facilitate entering the tool in the meat. At the opposite end of the tool the tube members are formed with beveled extremities, as shown in Fig. 3, and the side walls of the inner member 3 are similarly beveled to provide cutting edges, as shown in Figs. 2 and 3.

In larding meat the tool is adjusted as shown in full lines in Fig. 2—that is to say, with the tube open the tool is grasped at the pointed end and forced into the fat or other material, the beveled open end of the tube cutting its way as the tube is entered. By now giving the blade or pointed end of the inner member a half-turn in either direction the beveled edge of such member in cutting its way through the fat will cut and inclose a strip within the tube, which latter by turning the blade in the manner described closes, as indicated by dotted lines in Fig. 2. The tool is now withdrawn and entered point first into the meat to be larded. It is forced through the meat until the point reappears and may be conveniently grasped. By now giving the point a half-turn in either direction the tube will be opened and thus adjusted may be withdrawn, leaving the strip of fat or the like in the body of the meat.

The use of the tool for salting meat will be obvious from the foregoing description.

Having therefore described my invention, I claim—

1. A larding-tool, comprising two sections relatively adjustable to form a complete tube open at one end and closed at the other end, said closed end being extended and tapered to a point.

2. A larding-tool, comprising two sections relatively adjustable to form a complete tube open at one end and closed and pointed at the other end, said tube-sections having side and end cutting edges.

3. A larding-tool, comprising a tube open at one end, closed at the other, and divided lengthwise into sections relatively adjustable to open and close the tube throughout its effective length, the end and sides of said tube-sections being beveled to form cutting edges and means for adjusting the sections.

4. A larding-tool, comprising a tube divided lengthwise into sections, one of the sections terminating in a sleeve and the other section in a shank swiveled in the sleeve and having its projecting end pointed.

In testimony whereof I affix my signature in the presence of two witnesses.

ROBERT R. REYNOLDS.

Witnesses:
HENRIETTA STULZ,
ALLEN ROSS.